United States Patent [19]
Rutke et al.

[11] Patent Number: 5,445,255
[45] Date of Patent: Aug. 29, 1995

[54] SPRAG ONE-WAY CLUTCH WITH INERTIA RESISTANCE MEMBERS

[75] Inventors: Russell J. Rutke, Palos Heights; Gregory J. Malecha, Naperville, both of Ill.

[73] Assignee: Borg-Warner Automotive, Inc., Sterling Heights, Mich.

[21] Appl. No.: 88,694

[22] Filed: Jul. 8, 1993

[51] Int. Cl.⁶ ............................................. F16D 41/07
[52] U.S. Cl. ............................ 192/45.1; 192/41 A
[58] Field of Search .................... 192/41 A, 45.1; 188/82.8

[56] References Cited

U.S. PATENT DOCUMENTS

| | | | |
|---|---|---|---|
| 2,824,635 | 2/1958 | Troendly et al. | 192/45.1 |
| 2,940,568 | 6/1960 | Fagiano | 192/45.1 |
| 3,545,581 | 12/1970 | Kent | 192/45.1 |
| 4,089,395 | 5/1978 | Fogelberg | 192/41 A |
| 4,635,770 | 1/1987 | Shoji et al. | 192/41 A |
| 4,875,364 | 10/1989 | Levine et al. | 73/61.1 |
| 4,875,564 | 10/1989 | Leitz et al. | 192/45.1 |
| 4,998,605 | 3/1991 | Ferris | 192/41 A |
| 5,024,308 | 6/1991 | Kinoshita et al. | 192/41 A |
| 5,038,903 | 8/1991 | Akagi et al. | 192/41 A |
| 5,139,123 | 8/1992 | Rutke | 192/45.1 |
| 5,176,232 | 1/1993 | Malecha | 192/45 |
| 5,291,978 | 3/1994 | Numata | 192/45.1 |

FOREIGN PATENT DOCUMENTS

| | | |
|---|---|---|
| 0370119A1 | 5/1990 | European Pat. Off. . |
| 0436291A1 | 7/1991 | European Pat. Off. . |
| 0508564A2 | 10/1992 | European Pat. Off. . |
| 63-180731 | 7/1988 | Japan .............. 192/41 A |
| 2051260A | 1/1981 | United Kingdom . |

*Primary Examiner*—Richard M. Lorence
*Attorney, Agent, or Firm*—Brooks & Kushman; Greg Dziegielewski

[57] ABSTRACT

An improved one-way clutch includes an outer race having an annular inner surface, an inner race having an annular outer surface disposed coaxially with the outer race, a plurality of sprags spaced circumferentially between the inner surface and outer surface, a sprag holder for holding the sprags in an annular space between the annular surfaces and a plurality of inertia resistance members having an arcuately conforming engagement surface mounted about the sprag holder, the arcuately conforming engagement surface being in engagement with one of the said inner surface and outer surface to provide torque resistant drag between the sprag holder and one of the inner and outer surfaces.

9 Claims, 3 Drawing Sheets

SPRAG ONE-WAY CLUTCH WITH INERTIA RESISTANCE MEMBERS

TECHNICAL FIELD

This invention relates to one-way clutches having tiltable sprags disposed between concentric races for controlling torque delivery in a torque flow path between a driving member and a driven member.

BACKGROUND ART

Conventional sprag type clutches contain inner and outer concentric races, a plurality of sprags disposed between the races and a holder sometimes referred to as a cage for mounting the sprags. In clutches such as shown in U.S. Pat. Nos. 2,824,635 and 4,998,605, the holder is of one piece construction and the sprags are mounted in the plurality of aligned openings or windows around the holder. In other clutches such as shown in U.S. Pat. No. 4,875,564, inner and outer concentric annular rings define the holder and likewise mount the sprags therein. In both types of clutches, the sprags are tiltable to engage and disengage the concentric clutch races. The sprags tilt to engage and lock the clutch when moving in one direction of rotation and tilt to disengage and allow overrunning of the clutch when moving in the opposite direction.

In such clutches a frictional force imparting member usually referred to as an inertia resistance or drag member is sometimes provided between the holder and the driving race to more reliably transmit to the sprags the movement of the driving race when it is suddenly accelerated or decelerated or rotates at high speed.

U.S. Pat. No. 4,635,770 discloses a one-way clutch having a holder defined by inner and outer parallel annular band portions. A part of one of the annular band portions defined as a connecting portion is cut and bent so as to have a planar portion which bears against one of the race surfaces thereby forming the frictional force imparting member.

U.S. Pat. No. 5,024,308 discloses a one-way clutch wherein the axial end of the holder has been modified by means of a lancing and bending operation to form a radially protruding curved portion defining the frictional force imparting member which generates dragging torque between the holder and one of the clutch races.

Other designs for inertia resistance or drag members in a one-way clutch include the use of drag clips which are comprised of metal spring-type elements having a planar frictional engagement surface. These clips are mounted on the holder in aligned openings or windows around the holder to provide a dragging torque between the holder and the outer clutch race. The engagement surface of these drag members is often planar and non-conforming to the race configuration.

DISCLOSURE OF THE INVENTION

An object of the present invention is to provide an improved one-way clutch having an improved inertia resistance or drag member which optimizes indexing and also simplifies manufacturing and assembly into the clutch.

Another object of the present invention is to provide an improved one-way clutch having an improved inertia resistance or drag member which provides improved compliance with a race surface.

Another object of the present invention is to provide an improved one-way clutch having an improved inertia resistance or drag member having a race engaging surface that conforms with the race.

Another object of the present invention is to provide an improved one-way clutch having an improved inertia resistance or drag member whereby incremental torque adjustment can be easily achieved by material and quantity selection of the inertia resistance members.

Another object of the present invention is to provide an improved one-way clutch having an improved inertia resistance or drag member which has an arcuate axial cross-section in the axial direction which provides compliant contact with a race surface.

Yet another object of the present invention is to provide an improved one-way clutch having an improved inertia resistance or drag member of a conformable elastomeric material which provides compliant contact with a race surface.

Another object of the present invention is to provide an improved one-way clutch having an improved inertia resistance or drag member with improved indexing as the member passes over lube holes in the race surface.

In carrying out the above objects and other objects of the invention, the improved one-way clutch includes an outer race having an annular inner surface and an inner race having an annular outer surface. The inner race is disposed coaxially with the outer race. A plurality of sprags is spaced circumferentially at predetermined intervals between the inner surface and the outer surface. The sprags are engageable with the inner surface and the outer surface by tilting in a peripheral direction relative of the surfaces to transmit a torque between the two races.

A sprag holder or cage, including a plurality of openings or windows spaced circumferentially around the sprag holder for positioning the sprags, is mounted in the annular space between the races. A plurality of inertia resistance or drag members, each having an arcuately conforming engagement surface, are mounted on the sprag holder. The arcuately conforming engagement surfaces engage with one of the inner surface or outer surface of the outer or inner race respectively to provide torque resistant drag between the sprag holder and one of the inner and outer surfaces.

In one embodiment of the invention, the inertia resistance members are elongated wireform elements having a generally arcuate cross-section of a metallic material. The wireform elements have first and second ends for mounting the member in an axial disposition on the sprag holder. An engaging portion between the first and second ends defines the arcuately conforming engagement surface. Preferably the elongated wireform elements are made from spring steel.

In another embodiment of the invention, the inertia resistance members are elastomeric elements of a high temperature resistance elastomeric material having an end which elastically deforms to conform to the shape of the race surface thereby defining the arcuately conforming engagement surface. The elastomeric inertia resistance members can be disposed in the windows around the sprag holder or otherwise mounted. Preferably the elastomeric elements consist of nitryl rubber, silicone, fluoroelastomer, polyacrylate or neoprene.

Regulation of the drag resistant torque between the holder and one of the inner and outer surfaces of the respective clutch race in each embodiment is effected by the quantity and spring rate of the wireform elements or design and composition of the elastomeric elements disposed around the holder.

In another embodiment, the holder includes inner and outer concentric annular band portions for supporting both sides of the sprags with respect to a peripheral direction, between the inner surface and outer surface of the races. The band portions includes a plurality of windows spaced circumferentially therearound for receiving the sprags. A plurality of the wireform or elastomeric inertia resistance members having the arcuately conforming engagement surfaces are mounted on at least one of the bands for providing inertia resistance or drag between the holder and associated race surfaces.

The above objects and other objects, features, and advances of the present invention are readily apparent from the following detailed description of the best mode for carrying out the invention when taken in connection with the accompanying drawings.

BEST MODE FOR CARRYING OUT THE INVENTION

Figure 1:
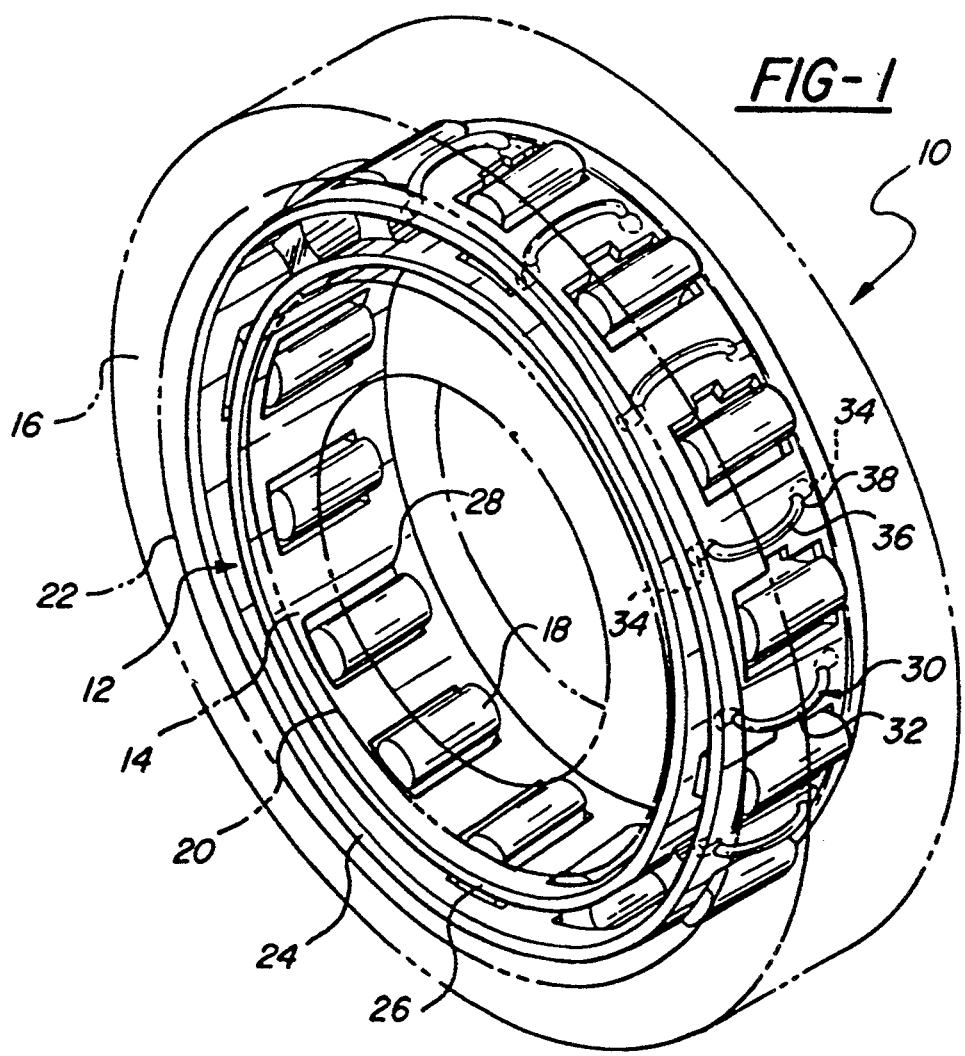
FIG. 1 is a perspective view of a one-way clutch including a holder assembly comprising inner and outer concentric annular band portions for supporting both sides of a plurality of sprags and illustrating a plurality of wireform inertia resistance members constructed in accordance with the present invention and mounted on the holder.

Referring to FIG. 1 of the drawings, an improved one-way clutch constructed in accordance with the present invention is generally indicated by reference numeral 10. As is more fully hereinafter described, clutch 10 includes a holder or cage 12 on which improved inertia resistance or drag elements are mounted.

As shown in FIG. 1, holder 12 is placed between inner and outer concentric race portions 14,16 shown in phantom to form clutch 10. The races 14,16 are substantially cylindrical and concentrically mounted. Each race 14,16 is adapted to be respectively connected with an associated rotatable member (not shown). A plurality of torque engagement members or sprags 18 is disposed between the races 14,16. Each sprag 18 is provided with a pair of concentric wedging surfaces for wedging against the outer surface 20 of the inner race 14 and inner surface 22 of the outer race 16 as the sprag is tilted into engagement with the races.

As illustrated in FIGS. 1 through 6, holder 12 is of two piece construction and comprised of inner and outer concentric annular band portions 24,26 for supporting both sides of the sprags 18 with respect to the peripheral direction, between the inner and outer races 14,16. The annular band portions 24,26 include a plurality of circumferentially spaced openings or windows 28 for holding the sprags 18.

A plurality of inertia resistance members or drag elements 30 each having an arcuately conforming engagement surface are mounted on the outer annular band portion 26. The inertia resistance members 30 in FIGS. 1 through 4 and 7 are defined by elongated wireform elements 32 of a metallic material having first and second ends 34 for mounting the element in an axial disposition on the sprag holder 12. The elongated wireform elements 32 also have an engaging portion 36 which defines the arcuately conforming engagement surface for engaging the inner surface 22 of the outer race 16. Preferably, the elongated wireform elements 32 are of a metallic material selected from the group consisting of spring steel. Although the elongated wireform elements 32 are illustrated as being mounted in the outer annular band portion 26 for engagement with the inner surface 22 of the outer race 16, these elements can likewise be mounted on the inner annular band portion 24 for engagement with the outer surface 20 of the inner race 14.

These elongated wireform elements 32 are of an arcuate cross-section and may have a round cross-section. The axially disposed wireform elements 32 bear against the inner surface 22 of the outer race 16 or the outer surface 22 of the inner race 14 to provide a frictional force between the element and the contacted race. Because the elongated wireform elements 32 are of an arcuate cross-section, they conformingly engage with an associated race surface for improved compliance. The wireform construction of the inertia resistance members 30 allows the members to be deformable for ease of mounting on the holder. The frictional force between the holder 12 and associated race 14,16 can be increased or decreased depending upon the type of spring steel used and the amount of displacement in the radial direction that the inertia resistance member undergoes when the holder is inserted between the races. The frictional force can also be varied by changing the number of elongated wireform elements 32 mounted on the holder 12.

Figure 2:
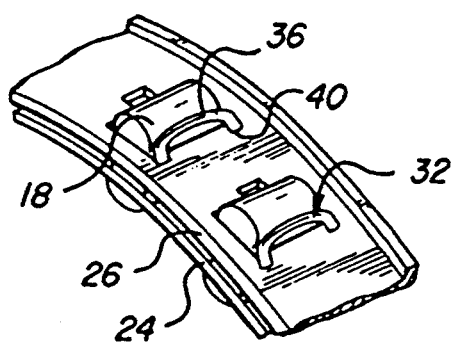
FIG. 2 is a sectional perspective view of another one-way clutch holder assembly illustrating an alternative mounting arrangement of the wireform resistance members.
Figure 3:
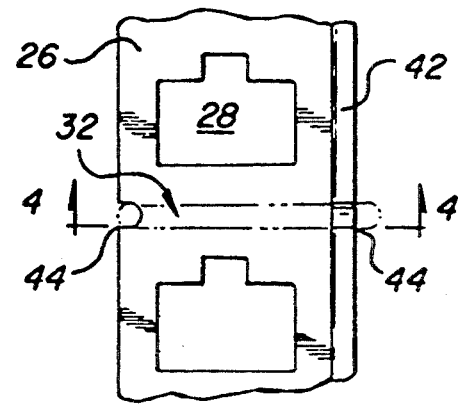
FIG. 3 is a sectional plan view of one annular band portion illustrating another mounting arrangement for the wireform resistance members.
Figure 4:
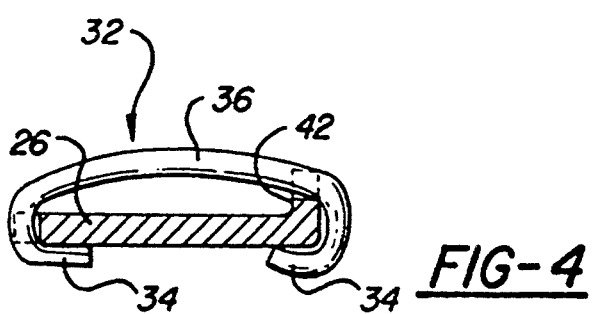
FIG. 4 is a sectional elevational view illustrating in detail the mounting arrangement of the wireform inertia resistance members shown in FIG. 3.

With continuing reference to FIG. 1, the elongated wireform elements 32 are mounted in apertures 38 formed between the windows 28 in the outer annular band 26. Alternatively, as illustrated in FIG. 2 the elongated wireform elements 32 are mounted in slots 40 formed as extensions of the windows 28. In FIGS. 3 and 4 the outer annular band portion 26 has a flange 42 standing upright on one end of the band and having a slight height. Notches 44 are formed in the flange 42 and opposed side of the annular band portion 26 between the windows 28 and the elongated wireform elements are mounted on the band through engagement of ends 34 and notches 44.

Figure 5:
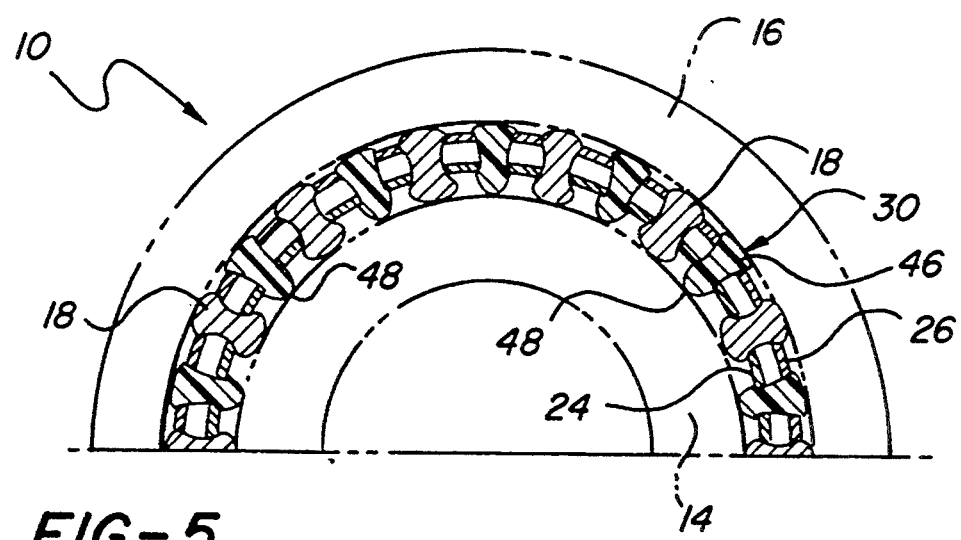
FIG. 5 is a sectional elevational view of another holder assembly for the one-way clutch illustrating elastomeric inertia resistance members constructed in accordance with another embodiment of the invention and mounted on the concentric annular bands.
Figure 6:
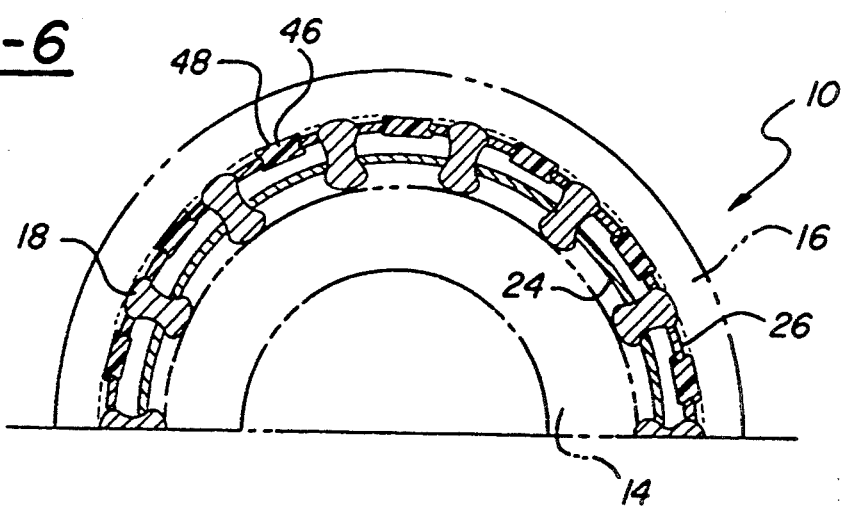
FIG. 6 is a sectional elevational view of another holder having elastomeric inertia resistance members of an alternative configuration mounted on an annular band.

FIGS. 5 and 6 illustrate an alternative embodiment of the holder 12 wherein the plurality of inertia resistance members 30 are elastomeric elements 46 of a high temperature resistance elastomeric material. The high temperature resistance elastomeric material is mounted on one or both of the annular band portions 24,26 and has an end 48 which deforms to define the arcuately conforming engagement surface, during engagement with one of the inner surface 22 of the outer race 16 and outer surface 20 of the inner race 14 to arcuately conform to the race surface. Preferably, the elastomeric material of the elastomeric elements 46 is selected from the group consisting of nitryl rubber, silicon, fluoroelastomer, polyacrylate and neoprene. These materials are capable of providing for friction inertia with an associated race 14,16, while also exhibiting long-term wear characteristics.

As are the elongated wireform elements 32, the elastomeric elements 46 are mountable for providing frictional engagement with the inner surface 22 of the outer race 16 or the outer surface 20 of the inner race 14. Elastomeric elements can be mounted in windows 28 not occupied by sprags 18 or otherwise mounted as illustrated in FIGS. 5 and 6.

In FIG. 5 the elastomeric element 46 is illustrated as providing a frictional force between both the inner and outer races 14,16. In FIG. 6 the elastomeric elements 46 are mounted on the outer annular band portion 26 between the spaced openings or windows 28 for frictional engagement with inner surface 22 of the outer race 16. Specific design criteria for drag amounts or inertia forces can be met by varying the number of resistance members incorporated into any given clutch 10. Thus, a clutch assembly including the improved holder provides for much greater versatility and adaptability to design consideration than known prior art clutch assemblies.

Figure 7:
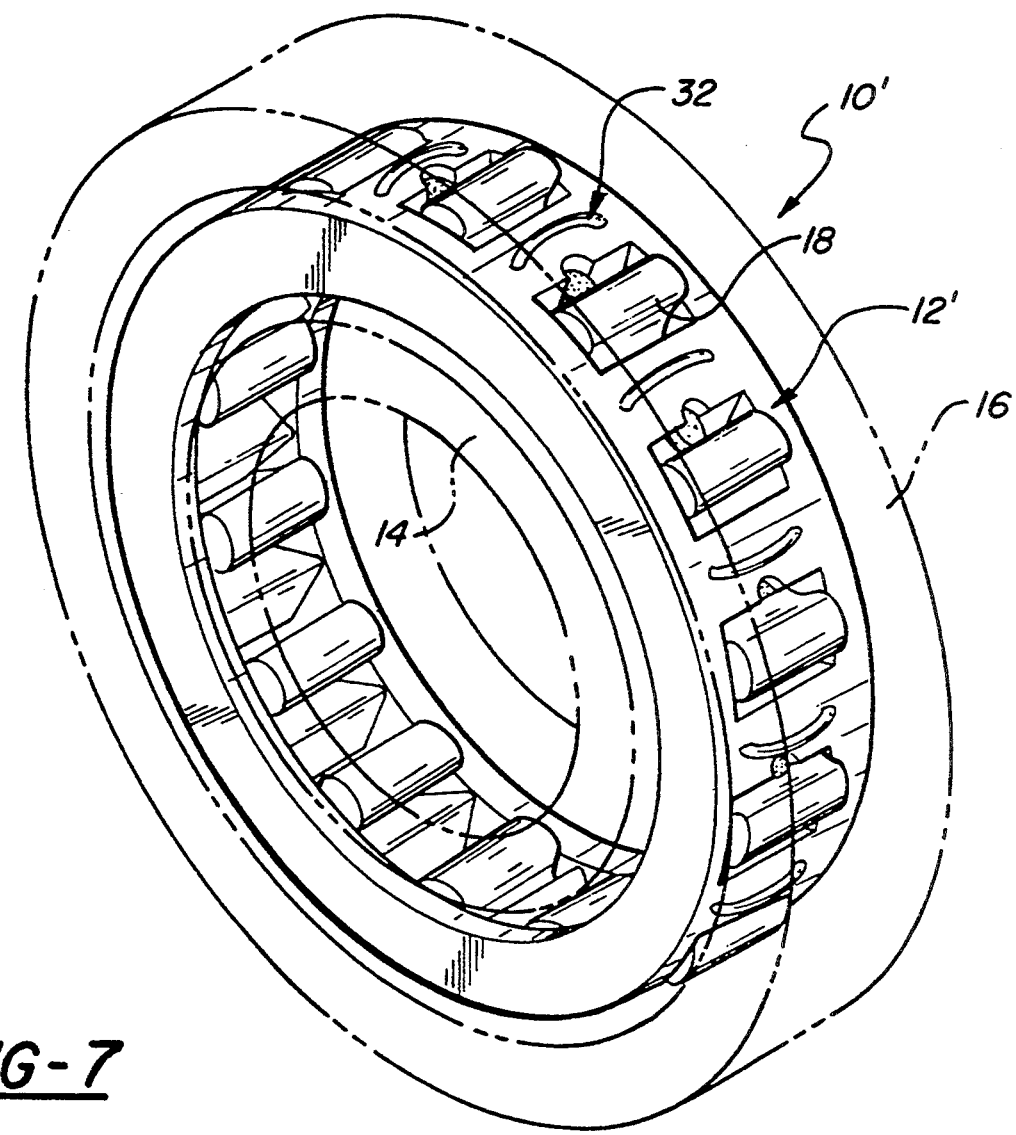
FIG. 7 is a perspective view of a one-way clutch including a one piece holder assembly for mounting a plurality of sprags and illustrating a plurality of the wireform inertia resistance members mounted on the holder.
Figure 8:
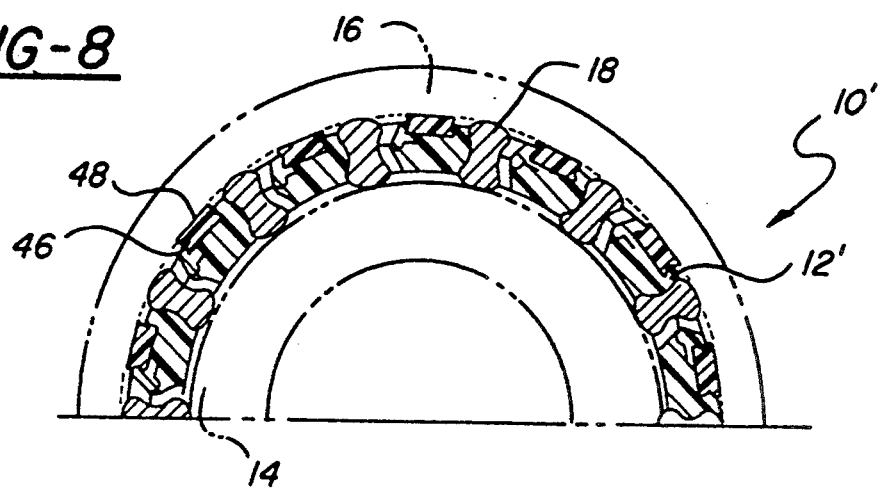
FIG. 8 is a partial side elevational view of another one piece holder assembly for the one-way clutch illustrating a plurality of the elastomeric inertia resistance members mounted on the holder.
Figure 9:
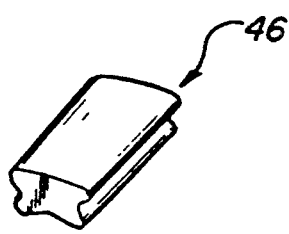
FIGS. 9 through 13 are perspective views of elastomeric inertia resistance members of the present invention illustrated in various shapes.
Figure 10:
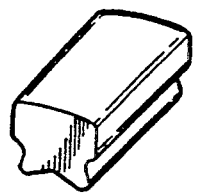
Figure 11:
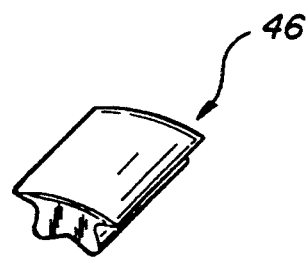
Figure 12:
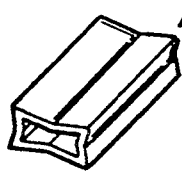
Figure 13:
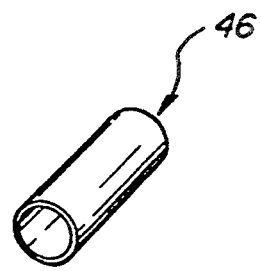

Referring FIGS. 7 and 8 of the drawings, holder 12' is of a one piece construction including a plurality of spaced openings or windows 28' around its periphery for receiving sprags 18'. In FIG. 7, elongated wireform elements 32 as hereinabove described are mounted on the holder 12' between the openings. In FIG. 8, elastomeric members 46' are mounted on the outer peripheral surface 50 of the holder 12' between the openings 28'.

FIGS. 9 through 13 illustrate various configurations which the elastomeric members 46,46' can take. The configuration of the elastomeric members 46,46' can also be changed to affect the amount of frictional force imparted between the holder 12,12' and the inner surface 22 of the outer race 16 or outer surface 20 of the inner race 14.

While the best mode for carrying out the invention has been described in detail, those familiar with the art to which this invention relates will recognize various alternative designs and embodiments for practicing the invention as defined by the following claims.

What is claimed is:

1. A one-way clutch comprising:
   an outer race having an annular inner surface, an inner race having an annular outer surface and disposed coaxially with said outer race;
   a plurality of sprags spaced circumferentially at a predetermined interval between said inner surface and said outer surface, and engageable with said inner surface and said outer surface by tilting in a peripheral direction relative of said surfaces to transmit a torque between said two races;
   a sprag holder for holding said sprags in an annular space between said annular surfaces; and
   a plurality of elongated wireform metallic elements having an arcuately conforming engagement surface mounted about said sprag holder, said engagement surface being in engagement with one of said inner and outer surfaces to provide torque or inertia resistant drag between said sprag holder and one of said inner and outer surfaces, said wireform elements having first and second ends for mounting said elements in an axial disposition on said sprag holder, said wireform elements having an engaging portion defining said engagement surface between said ends.

2. A one-way clutch according to claim 1, wherein said metallic material is spring steel.

3. A one-way clutch according to claim 1, wherein said engaging portion bears against said inner surface of the outer race and permits controlled indexing.

4. A one-way clutch according to claim 1, wherein said engaging portion bears against said outer surface of the inner race and permits controlled indexing.

5. A one-way clutch comprising:
   an outer race having an annular inner surface, an inner race having an annular outer surface and disposed coaxially with said outer race;
   a plurality of sprags spaced circumferentially at a predetermined interval between said inner surface and said outer surface, said sprags being engageable with said inner surface and said outer surface by tilting in a peripheral direction relative to said surfaces to transmit a torque between said two races;
   a sprag holder for holding said sprags in an annular space between said annular surfaces, said sprag holder including inner and outer concentric annular band portions for supporting said sprags with respect to said peripheral direction between said inner surface and said outer surface; and
   a plurality of elongated wireform metallic elements having an arcuately conforming engagement surface mounted about said sprag holder, said engagement surface being in engagement with one of said inner and outer surfaces to provide torque or inertia resistant drag between said sprag holder and one of said surfaces, said wireform elements having first and second ends for mounting said elements in an axial disposition on said sprag holder, said wireform elements having an engaging portion defining said engagement surface between said ends.

6. A one-way clutch according to claim 5, wherein said metallic material is spring steel.

7. A one-way clutch according to claim 5, wherein said metallic material is selected from the group consisting of bronze and brass.

8. A one-way clutch according to claim 5, wherein said engaging portion bears against said inner surface of the outer race and permits controlled indexing.

9. A one-way clutch according to claim 5, wherein said engaging portion bears against said outer surface of the inner race and permits controlled indexing.

* * * * *